United States Patent
Bowman et al.

(10) Patent No.: US 7,279,073 B2
(45) Date of Patent: Oct. 9, 2007

(54) APPARATUS FOR LIQUID-BASED FIBER SEPARATION

(75) Inventors: David James Bowman, Charlotte, NC (US); Thomas Reginald Eason, Jr., Charlotte, NC (US); John Walter Renz, Waxhaw, NC (US)

(73) Assignee: U.S. Greenfiber, LLC, Charlotte, NC (US)

( * ) Notice: Subject to any disclaimer, the term of this patent is extended or adjusted under 35 U.S.C. 154(b) by 243 days.

(21) Appl. No.: 10/217,947

(22) Filed: Aug. 13, 2002

(65) Prior Publication Data

US 2004/0062879 A1   Apr. 1, 2004

(51) Int. Cl.
D21D 1/00     (2006.01)

(52) U.S. Cl. ............... 162/261; 162/4; 162/5; 162/55; 162/57; 162/8; 428/2; 428/375; 427/212; 241/5; 241/24.1

(58) Field of Classification Search ......... 162/261, 162/4, 5, 55, 8; 428/375
See application file for complete search history.

(56) References Cited

U.S. PATENT DOCUMENTS

| | | | |
|---|---|---|---|
| 4,129,259 A | 12/1978 | Vokes | 241/20 |
| 4,134,242 A | 1/1979 | Musz et al. | 52/309 |
| 4,177,618 A | 12/1979 | Felter | 52/743 |
| 4,359,353 A | 11/1982 | Kydd | 149/2 |
| 4,363,965 A | 12/1982 | Soberman et al. | 250/302 |
| 4,385,477 A | 5/1983 | Walls et al. | 52/743 |
| 4,390,452 A | 6/1983 | Stevens | 252/408.1 |
| 4,399,645 A | 8/1983 | Murphy et al. | 52/743 |
| 4,441,943 A | 4/1984 | Kydd | 149/109.4 |
| 4,508,860 A * | 4/1985 | Hawes | 524/13 |
| 4,712,347 A | 12/1987 | Sperber | 52/404 |
| 4,737,238 A * | 4/1988 | de Ruvo | 162/4 |
| 4,780,179 A * | 10/1988 | Clement | 162/5 |
| 5,057,268 A | 10/1991 | Muller | 376/157 |
| 5,114,281 A | 5/1992 | Hartnett et al. | 406/39 |
| 5,302,245 A * | 4/1994 | Nadeau | 162/8 |
| 5,355,653 A | 10/1994 | Henri | 52/743 |
| 5,362,362 A | 11/1994 | Cunningham et al. | 162/5 |
| 5,365,716 A | 11/1994 | Munson | 52/743 |
| 5,377,918 A | 1/1995 | Garcia Pastor et al. | 241/46.17 |
| 5,385,639 A * | 1/1995 | Hou et al. | 162/5 |
| 5,409,839 A | 4/1995 | Balestrieri et al. | 436/56 |
| 5,451,505 A | 9/1995 | Dollinger | 435/6 |
| 5,464,161 A | 11/1995 | Upton, III et al. | 241/21 |
| 5,474,937 A | 12/1995 | Adnerson, II et al. | 436/27 |
| 5,511,281 A | 4/1996 | Webster | 15/330 |
| 5,516,580 A | 5/1996 | Frenette et al. | 428/288 |
| 5,527,432 A * | 6/1996 | Leuthold et al. | 162/189 |
| 5,534,301 A * | 7/1996 | Shutt | 427/377 |
| 5,580,446 A | 12/1996 | Markham | 210/202 |
| 5,593,098 A | 1/1997 | Spencer et al. | 241/46.01 |
| 5,645,229 A | 7/1997 | Spencer et al. | 241/20 |
| 5,667,079 A | 9/1997 | Jongebloed | 209/589 |
| 5,707,489 A * | 1/1998 | Von Grumbkow et al. | 162/4 |
| 5,714,040 A | 2/1998 | Poy et al. | 162/4 |
| 5,747,937 A | 5/1998 | Wiesemann et al. | 315/159 |
| 5,755,926 A | 5/1998 | Hankins et al. | 162/6 |
| 5,760,394 A | 6/1998 | Welle | 250/303 |
| 5,865,947 A * | 2/1999 | Markham et al. | 162/5 |
| 5,895,556 A | 4/1999 | Ferguson et al. | 162/5 |
| 5,921,055 A | 7/1999 | Romes et al. | 52/742.13 |
| 5,984,590 A | 11/1999 | Church, II et al. | 406/48 |
| 6,010,012 A | 1/2000 | Gero | 209/306 |
| 6,025,027 A | 2/2000 | Shutt | 427/337 |
| 6,045,298 A | 4/2000 | Lytle | 406/48 |
| 6,047,518 A | 4/2000 | Lytle | 52/742.13 |
| 6,053,439 A | 4/2000 | Locke et al. | 241/20 |
| 6,074,527 A | 6/2000 | Hsu et al. | 162/111 |
| 6,082,639 A | 7/2000 | Pentz et al. | 239/655 |
| 6,083,350 A * | 7/2000 | Krebs | 162/261 |
| 6,088,968 A | 7/2000 | Williston, Jr. et al. | 52/64 |
| 6,112,490 A | 9/2000 | Meyer | 52/407.3 |
| 6,113,990 A | 9/2000 | Killingsworth | 427/426 |
| 6,228,212 B1 | 5/2001 | Heise et al. | 162/4 |
| 6,596,209 B2 * | 7/2003 | Uhland et al. | 264/115 |
| 2002/0150758 A1 * | 10/2002 | Prieto | 428/375 |

OTHER PUBLICATIONS

Technical Support Document and Statement of Basis for Daishowa America Co LTD Air Operating Permit, Feb. 1, 2000.*
Powder Coatings To Recycling; Encyclopedia of Chemical Technology, vol. 19, pp. 986-992, copyright 1982.

* cited by examiner

*Primary Examiner*—Mark Halpern
(74) *Attorney, Agent, or Firm*—MacCord Mason PLLC

(57) ABSTRACT

An apparatus for treating fibrous material is disclosed. The apparatus may include a fiber separator, a de-liquefier, a dry-to-wet blender and a flash dryer. The fiber separator may be a liquid-based fiber separator. The de-liquefier is for removing liquid from the fibrous material. The blender downstream, which may be a dry-to-wet blender, is for adding a dry material to the de-liquefied fibrous material. The de-liquefier and a dry-to-wet blender are downstream from the fiber separator and the dry-to-wet blender may be downstream from the de-liquefier. The flash dryer, which is even further downstream, is for drying the treated fibrous material.

25 Claims, 11 Drawing Sheets

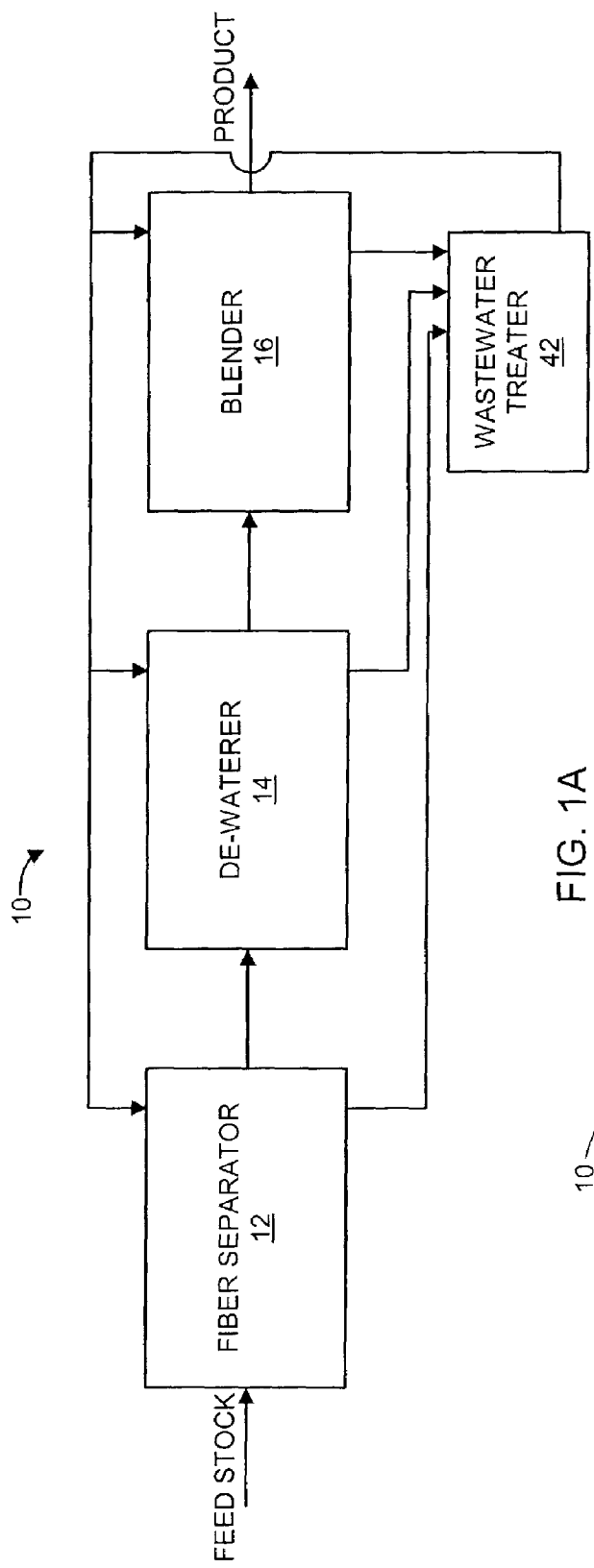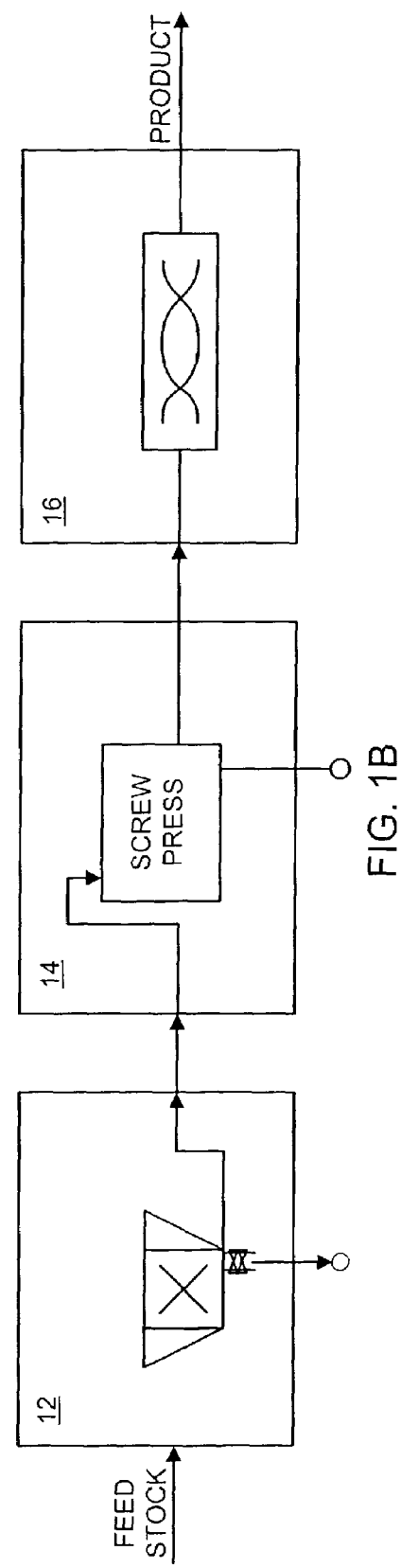
FIG. 1A
FIG. 1B

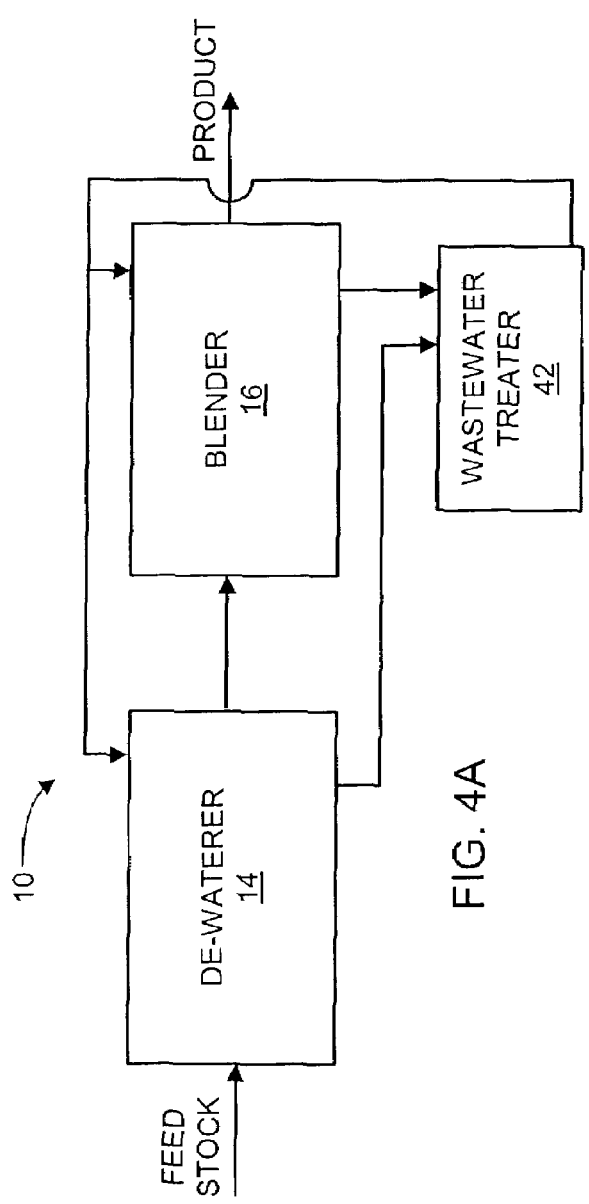
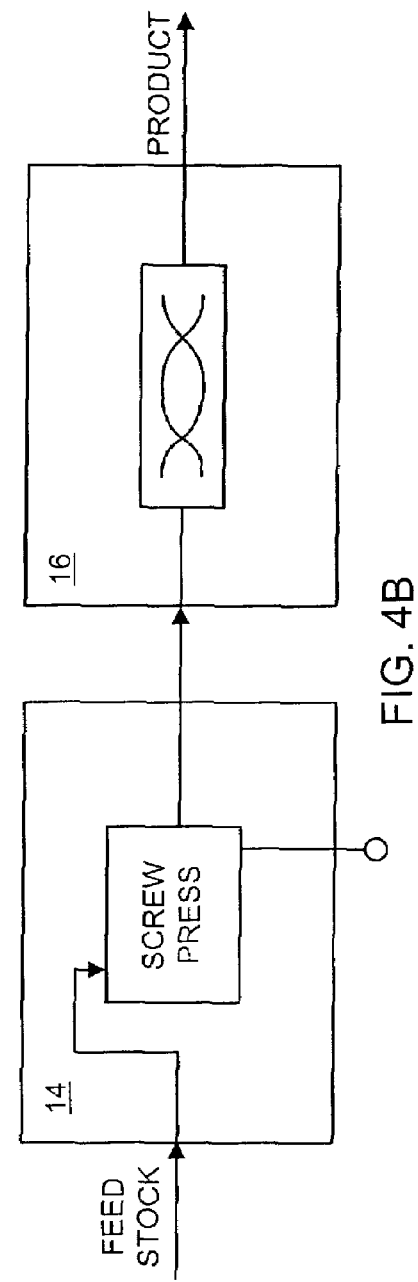
FIG. 4A
FIG. 4B

APPARATUS FOR LIQUID-BASED FIBER SEPARATION

BACKGROUND OF THE INVENTION (1) Field of the Invention

The present invention relates generally an apparatus for treating fibrous materials, such wood-based cellulosic fibers; nonwood-based cellulosic fibers; natural textile fibers, and man-made fibers and, more particularly, to an apparatus for treating cellulosic fibrous material for subsequent processing into thermal and acoustic loose-fill installation.

(2) Description of the Prior Art

Each waste paper (WP) treatment plant is specifically designed to raise the quality of the input WP grades up to the quality required for subsequent use. This goal includes enabling the lowest practical quality of WP grade to be used. System designers ought to consider the WP treatment plant as an entity—not just the influence of each individual piece of equipment.

In WP treatment plants for converting WP to cellulosic insulation, traditionally dry processing has been used. Over the years, a variety of dry mills have been used to break down WP and remove prohibitive materials. Prohibitive materials ("prohibitives") are materials other than paper (e.g., plastic, metal, glass, etc.) (a.k.a. "contraries" in the paper recycling industry). Some dry mills have involved high-energy impact devices. Other dry mills have involved grinding WP down to the smallest particle size, sometimes even all the way to fiber. These size reduction processes tend to be high mechanical energy and high horsepower type of processes. Also, these processes tend to generate a lot of dust. Moreover, these processors are not robust because input WP must be of a quality that contains limited amounts, types, and size of prohibitives. The use of the high mechanical energy makes it important to eliminating any prohibitives from these processes that may facilitate sparking.

Even after eliminating any prohibitives that may facilitate sparking, it is still important in dry processing to add fire retardants to the WP. Apart from making the cellulosic insulation fire resistant, it is desirable to make the WP fire resistant as it is being processed into a finished product to prevent fire. Fires may consume WP before it is processed into a finished product. Also, fires tend to disrupt production in the plant process stream. To that end, fire retardants such as boric acid or ammonium sulfate, may be added to the WP. Traditionally, fire retardants have been added as powders, or sometimes, as liquid sprayed onto the dry WP at some point in the plant process stream. A disadvantage with adding fire retardants as liquid is that a means for drying the WP must be worked out since WP treatment plants for converting WP to cellulosic insulation tend not to have dryers.

An approach to trying to eliminate some of the above-mentioned problems has been to use a Continuous Batch Fiber Recovery System (CBFRS, Regenex). This approach does not fit neatly into traditional paper industry WP treatment approaches because it comes from the laundry industry, where it has been used for more than 15 years.

In CBFRS, a tunnel washer having a battery of basic modules is used. Collectively, these modules function initially like a drum pulper, and subsequently like a de-inking washer. The modules also permit bleaching, either during de-inking or following pulping.

The basic module consists of a rotating inner cylinder and an outer screen shell. The rotating inner cylinder includes a scoop that rocks through 230° initially, then through 360°, and so transfers process WP to the next module. This continual dropping action separates prohibitives from WP to yield good fiber. The prohibitives are discharged from the end of the cylinder. The outer screen shell accepts separated good fiber during the WP bale re-pulping stage, and allows ink to pass through during any de-inking washing stage. The complete system requires some additional items, such as screens, and may be a wet lap de-watering device. A clarifier provides water closure. Ash, ink particles and other prohibitives are removed so that the water can be re-circulated to the tunnel washer. Among the disadvantage of CBFRS are equipment expense and the slowness of that process.

Thus, there remains a need for a new and improved apparatus for treating fibrous material which is sufficiently robust so as to be able to accommodate a broad spectrum of input materials and, more particularly, to an apparatus for liquid-based cellulosic fiber separation for subsequent processing into, for example, loose-fill insulation.

SUMMARY OF THE INVENTION

The present invention is directed to an apparatus for treating fibrous material. The apparatus may include a fiber separator, a de-liquefier, a dry-to-wet blender, and a flash dryer. The fiber separator may be a liquid-based fiber separator. The de-liquefier is for removing liquid from the fibrous material. The dry-to-wet blender downstream is for adding a dry material to the de-liquefied fibrous material. The de-liquefier and a dry-to-wet blender are downstream from the fiber separator and the dry-to-wet blender may be downstream from the de-liquefier. The flash dryer, which is even further downstream, is for drying the treated fibrous material.

The flash dryer may be a spray dryer. In addition to the flash dryer, there may be further equipment, such as, one or more of any one of a dust collector, a baler and/or a bagger.

The liquid-based fiber separator may be a high solids, low shear pulper. An aqueous based separator is a preferred type of liquid-based fiber separator.

Also, the apparatus may include a fiber cleaning system for removing prohibitives. The fiber cleaning system may be a washer for removing prohibitives. Further, the fiber cleaning system may include at least one conical cleaner for removing prohibitives. Alternative or even further, the fiber cleaning system may include a mesh screen for removing prohibitives. Moreover, the fiber cleaning system may include a surge tank for accumulating the cleaned fiber.

The de-liquefier may be a screw press. Further, the de-liquefier may include a bow screen. The output of said de-liquefier may be greater than about 25 weight percent solids, preferably, greater than about 40 weight percent solids.

The blender may be a twin-screw blender. The dry material to be included in the fibers may be a flame retardant. An example of a flame retardant is boric acid. The boric acid may be added to be about 10 weight percent of the de-liquefied fibrous material.

Also, the dry material to be included in the fibers may be a colorant. One example of a colorant is titanium dioxide. The colorant also may be a heat trap or impart heat trapping characteristic upon the fibers. In such cases, the heat trap colorant is a pigment, dye or other colored material selected for its relative ability to retard thermal movement compared to other materials.

Moreover, the dry material to be included in the fibers may include one or more tracer substances. One type of such tracer substances are called "taggants." Taggants are chemical or physical tracers that may be used to identify an explosive by manufacturer, lot number, and type, even after detonation. Such tracer substances may be selected from the group consisting of elements or molecules that can be analyzed by visual, calorimetric, radioactivity, spectrophoticmetric or other techniques. Accordingly, the tracer substances may be radioactive isotopes, such as Carbon 14; calorimetric indicators, such as pH indicators; visual indicators, such as colored chemicals; stable doping agents, such as elemental gold; or a combination of one or more of these types of tracer substances.

Finally, as used herein, fibrous materials should be broadly understood to include wood-based cellulosic fibers; nonwood-based cellulosic fibers; natural textile fibers, and man-made fibers. Also, natural and man-made fibers capable of entrapping or entraining air within its structure are particularly suitable for use in the present invention, such as rockwool, cellulosic fibers and glass fibers.

Accordingly, one aspect of the present invention is to provide an apparatus for treating fibrous material. The apparatus includes a liquid-based fiber separator; a de-liquefier; and a blender. The de-liquefier and blender are downstream from said liquid-based fiber separator. The de-liquefier is for removing liquid from the fibrous material and the blender is for adding supplementary materials.

Another aspect of the present invention is to provide an apparatus for treating fibrous material. The apparatus includes a de-liquefier and a dry-to-wet blender. The de-liquefier is for removing liquid from the fibrous material. The dry-to-wet blender is downstream from said de-liquefier. Also, the dry-to-wet blender is for adding a dry material to the de-liquefied fibrous material.

Still another aspect of the present invention is to provide an apparatus for treating fibrous material. The apparatus may include a fiber separator, a de-liquefier, a dry-to-wet blender and a flash dryer. The fiber separator may be a liquid-based fiber separator. The de-liquefier is for removing liquid from the fibrous material. The dry-to-wet blender downstream is for adding a dry material to the de-liquefied fibrous material. The de-liquefier and a dry-to-wet blender are downstream from the fiber separator. The flash dryer, which is further downstream, is for drying the treated fibrous material.

These and other aspects of the present invention will become apparent to those skilled in the art after a reading of the following description of the preferred embodiment when considered with the drawings.

BRIEF DESCRIPTION OF THE DRAWINGS

FIG. 1A is a block diagram of an apparatus according to the present invention;

FIG. 1B shows details of FIG. 1A;

FIG. 4A is an apparatus according to the present invention;

FIG. 4B is a detail of the apparatus of FIG. 4A;

FIG. 12 is a SEM photomicrograph of a sample of conventionally processed cellulosic fibers which have added a supplementary dry material showing the non-uniform coverage of the surface of the cellulosic, fibrous material; and.

DESCRIPTION OF THE PREFERRED EMBODIMENTS

Figure 2:
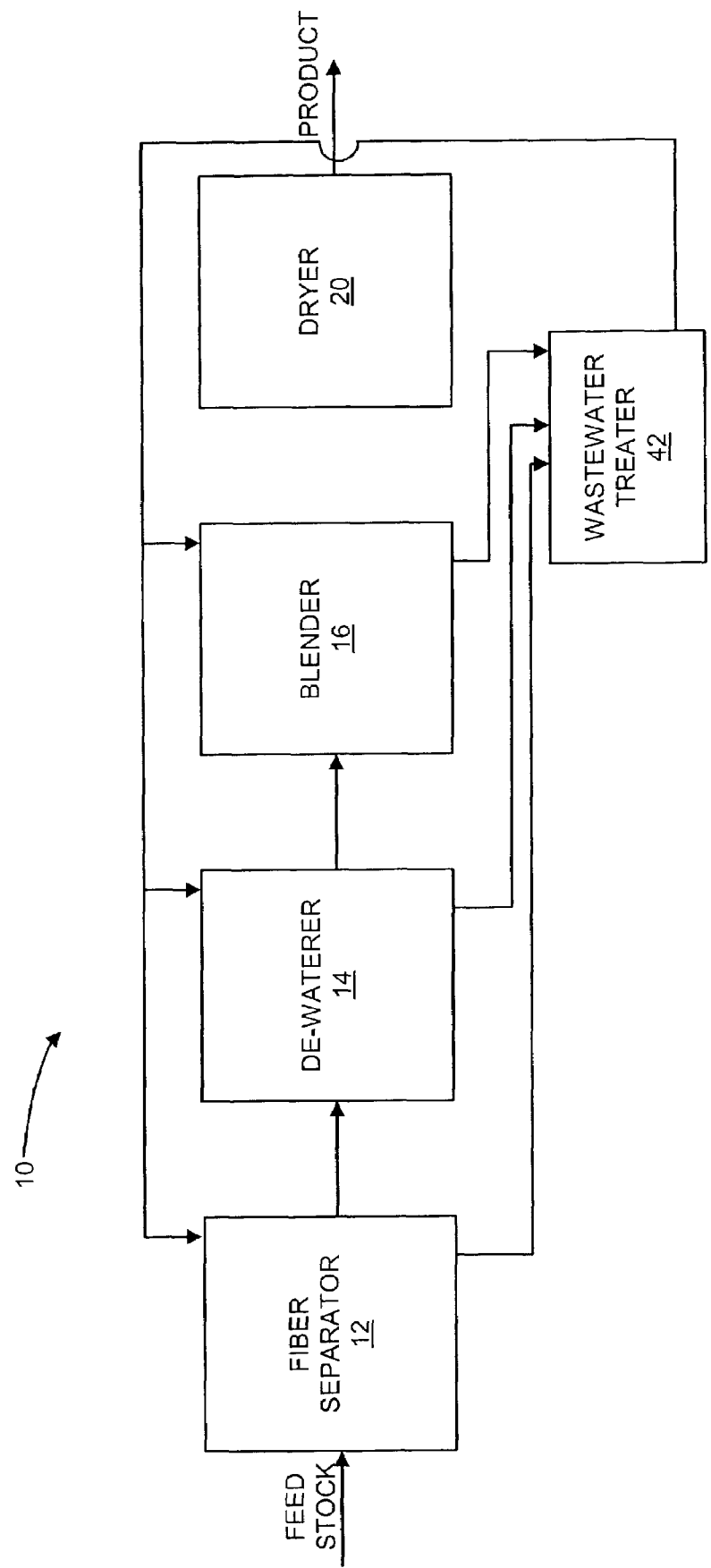
FIG. 2 is a block diagram of an apparatus according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIGS. 1A, 1B, 2, 4A, 4B and 9 in particular, it will be understood that the illustrations are for the purpose of describing the preferred embodiment of the invention and are not intended to limit the invention thereto. As best seen in FIGS. 1A, 2, and 4A, an apparatus for treating fibrous material, generally designated 10, is shown constructed according to the present invention. The apparatus 10 includes at least a de-liquefier 14 and blender 16, as appreciated by comparing FIGS. 1A, 2, and 4A. As best seen in FIGS. 1A and 2, the apparatus 10 may include a fiber separator 12. As further seen in FIG. 2, an apparatus 10 may include a dryer 20. Moreover, as seen in FIGS. 1A, 2, and 4A, the apparatus 10 may include a waste liquid treater 42. If the apparatus 10 includes a fiber separator 12, a de-liquefier 14, and a blender 16, the de-liquefier 14 and the blender 16 are downstream from the fiber separator 12. The fiber separator 12 is preferably a liquid-based fiber separator and more preferably, the liquid is aqueous based. Otherwise, if the apparatus 10 includes a de-liquefier 14 and a blender 16, the blender 16 is preferably downstream from the de-liquefier 14. The de-liquefier 14 is for removing liquid from the fibrous material. The blender 16 is for adding a dry material to the de-liquefied fibrous material.

Figure 5:
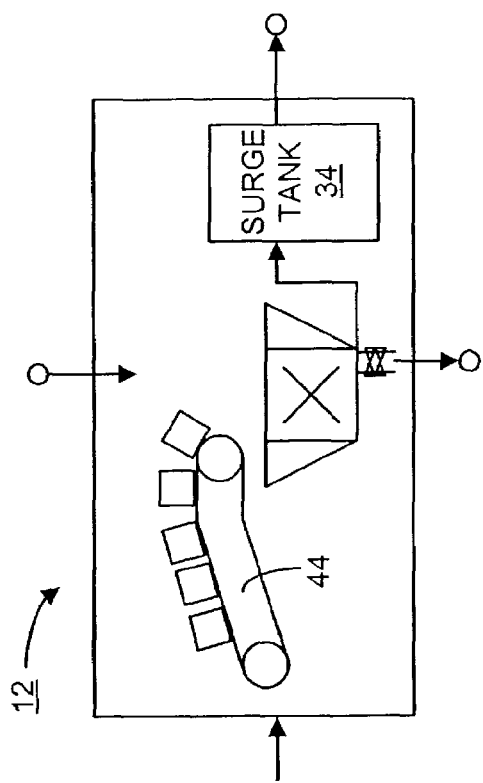
FIG. 5 is a detail of an alternative fiber separator of the apparatuses of FIGS. 1A and 2.
Figure 9:
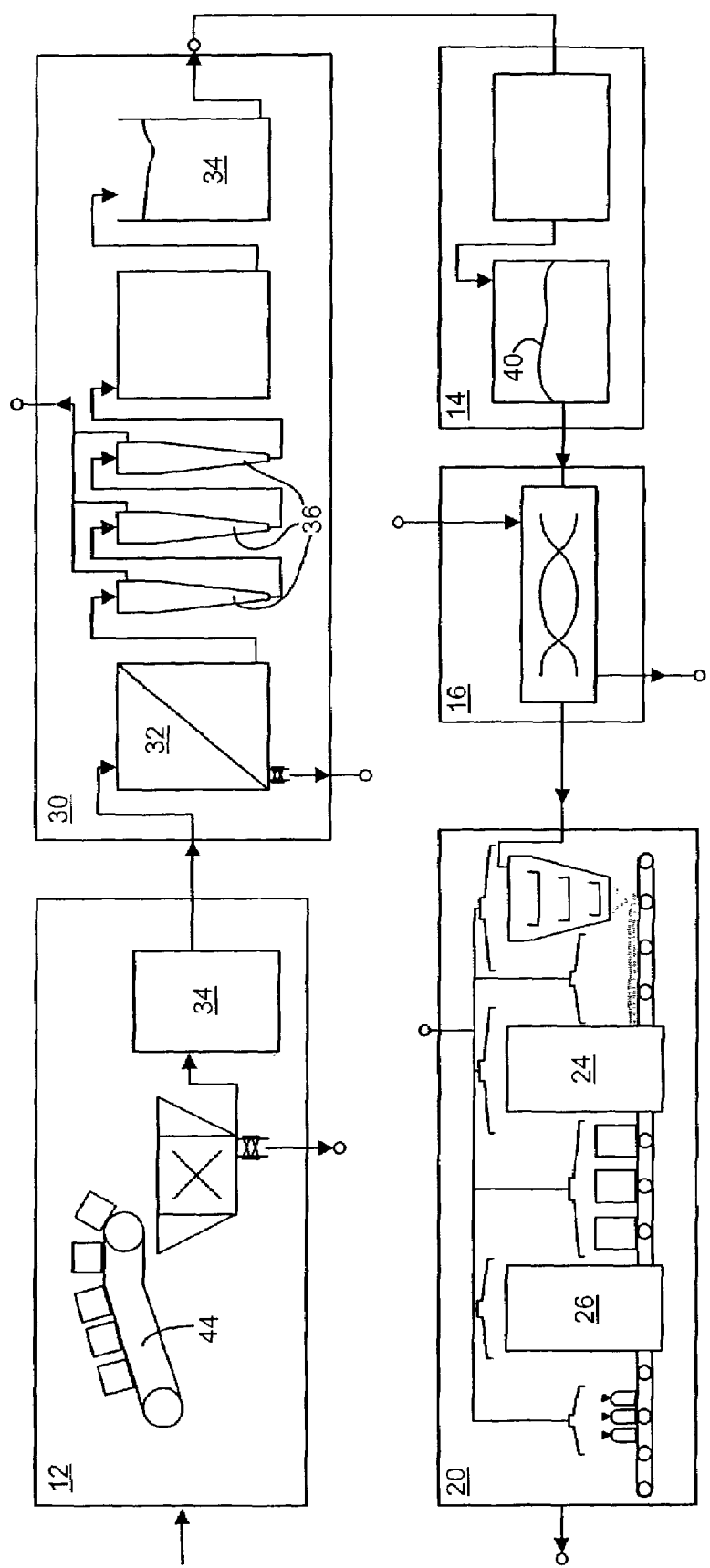
FIG. 9 is a detail of, among other things, a fiber separator, a de-liquefier, a blender, and a flash dryer of an apparatus according to the present invention.

In FIGS. 1A, 1B and 9, the apparatus 10 is depicted as including a fiber separator 12, a de-liquefier 14 and a blender 16 downstream from the fiber separator 12, and a waste liquid treater 42 in communication with each. FIG. 1B includes some further details about the fiber separator 12, de-liquefier 14 and blender 16. FIG. 5 shows the fiber separator 12 as further including a conveyor 44 for supplying, for example WP materials as bales. Also shown in FIG. 5 is that the fiber separator 12 may include a surge tank 34 for accumulating sufficient quantities of fiber slush to support pseudo continuous processes downstream.

The fiber separator 12 according to the present invention may include any one of a batch pulper and a continuous pulper as conventionally known in the papermaking art. Examples of such conventional fiber pulpers include: TA series pulpers (available from Allimand); Aquabrusher (available from APMEW or Bellmer); Grubbens pulper (available from Cellwood or Comer); Barracuda pulper and Shark pulper (available from GL&V); HDK Channel pulper, HD Vertical pulper, and Preflo pulper (available from Metso Paper/Fiber); Delta pulper and Hydrapulper pulper (available from Thermo Black Clawson, Lamort, Aikawa); and St series pulpers and Unipulper pulpers (available from Voith Paper).

When it is preferable to remove the more fragile prohibitive intact, batch pulping may be used together with a helical low attrition rotor (resembling an inflated corkscrew) to minimize prohibitive breakdown. Examples of such equipment include: Bi-Pulper (available from A. Celli and Comer); Tri-Dyne (available from GL&V); CHD (Continuous High Density pulper system with screen for accepts); SM-G Pulper (available from Metso Paper/Fiber); and Helico pulper and Hi-Con pulper (available from Thermo Black Clawson, Lamort). U.S. Pat. No. 4,129,259, the subject matter of which is herein incorporated by reference in its entirety, contains a disclosure relating to a Hi-Con pulper, available from Thermo Black Clawson.

The removal of large prohibitives from WP may be achieved by subsystems around the fiber separator 12. Depicted and not numbered in FIGS. 1B and 5 is a junk trap. In a junk trap, large stones, tramp metal, and other heavy materials sink into this dead area of the pulper, between 2 valves, and are automatically purged at desired time intervals. An example of such equipment includes a Privet Double Dumper™.

Not depicted in any of the figures and useful for removing long prohibitives (e.g., baling wire, rags, plastic strips, string, etc.) is a ragger. The long prohibitives entangle each other and may be withdrawn from the fiber separator 12 as an endless ragger rope by the capstan-like ragger. An example of such equipment includes the Valmet ragger (available from Metso Paper/Fiber). The rope may be periodically cut by a rag(ger) rope cutter, to facilitate its disposal. An example of such equipment includes the Valmet tail cutter (available from Metso Paper/Fiber). Broken ragger tails, weighing up to 3 tons, can be retrieved from the fiber separator 12 without emptying it. An example of equipment useful for such operations includes the Ragger tail grabber (available from Neilsen & Hiebert Systems).

Drum pulper provides an alternative approach to the conventional pulper. Its characteristics are continuous operation, minimum degradation of fibers and prohibitives, low power consumption (and thus energy saving), and a high space requirement. Examples of equipment useful for such an operation include: the Fibreflow Drum pulper (available from Andritz-Ahlstrom) and the Horizontal Drum-Soaking-Mixing-Screening System (available from Finckh).

To provide a treated fibrous material, which may be used subsequently processed into thermal, acoustic, etc. applications, it may be beneficial for the fiber separator 12 to include a secondary pulper downstream from the (primary) pulper. The secondary pulper complements the pulper's ability to take out large prohibitives—by removing high and low density prohibitives, while also deflaking undisintegrated flakes of paper. The secondary pulper may be either batch or continuous, and models are available for both batch and continuous (primary) pulpers. Examples of secondary pulpers include: Selector and Selepump pulpers (available from A. Celli); Epurex, ESC series, and Turboremover pulpers (available from Comer); Rejects-Master pulper (available from Finckh); BelPurge pulper (available from GL&V); Tamtrap TTP pulper (available from Metso Paper/Fiber); Dumping Poire (batch)+Helico pulper=Helipoire System, Poire Pulper (continuous), Hydra Impactor, Hydrapurge (available from Thermo Black Clawson, Lamort); and Contaminex, Fiberizer, and Turboseparator (available from Voith Paper).

Also, to provide a treated fibrous material for subsequent processing, it may be beneficial for the fiber separator 12 to include other equipment such as a fiber classifier, a dispersion system, and a kneading system. Examples of dispersion systems include: Krima (available from Cellwood, Comer and FMW), Diskperser (available from GL&V), Micar Processor, Diva (based on Conflo+HiPreheater fluffer/steam mixer. available from Metso Paper/Fiber); Frotapulper (available from MoDoMekan), Triturator/Kneading Disperser (available from Thermo Black Clawson, Lamort); Disperger (available from Voith Paper). Examples of kneading systems include: MDR Kneader (available from Andritz-Ahlstrom), Ultra Twin-Flyte (available from Thermo Black Clawson), Kneading-Disperger (available from Voith Paper).

The apparatus 10 includes a de-liquefier 14 downstream from the fiber separator 12. Referring to FIGS. 1B, such a de-liquefier 14 may include a screw press 40 and, a bowed screen 40. Likewise as shown in FIG. 6, the de-liquefier 14 may include a thickener for increasing the solids of the slurry that comes out of the liquid-based fiber separator 12 to an amount that would be between about 1 and 10 weight percent solids and even more preferably about 8 weight percent solids.

Figure 6:
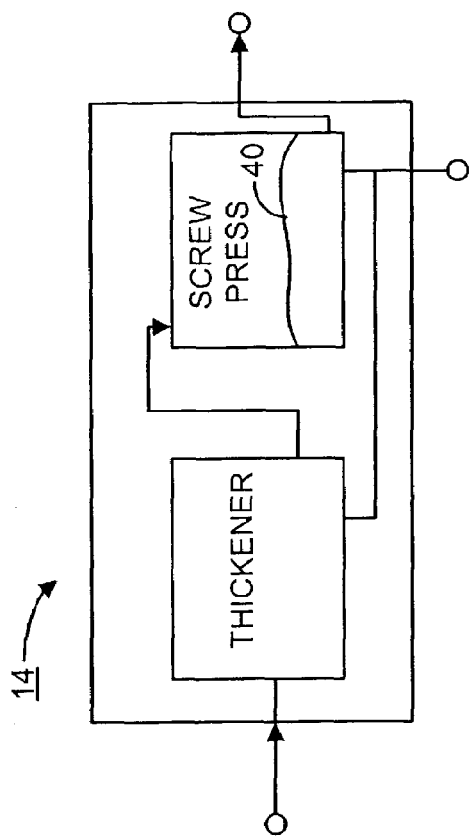
FIG. 6 is a detail of an alternative de-liquefier of the apparatuses of FIGS. 1A, 2, and 4A.

As depicted in FIGS. 6 and 9, the de-liquefier 14 may include any of the many types of equipment used for thickening, washing, or separation. The liquid removed by the de-liquefier 14 may be called filtrate, or pressate when from a press. The solid material from a filter may be called filter cake. Among such equipment is the belt filter press, for example, that includes: Double Wire Press (available from Andritz-Ahlstrom); BDP (available from Baker Process); Turbodrain (1 wire), Winkelpress (2 wires), and Cascade S (both types in series) (available from Bellmer and Comer); HC Press, Gap Washer, and TwinWire (with Paraformer headbox) (available from Metso Paper/Fiber and Phoenix Process Equipment); Saltec Belt Press (available from Saltec); DNT Washer (available from Thermo Black Clawson); Vario-Split (available from Voith Paper); and Osprey (available from William Jones, London).

As depicted in FIGS. 1B, 4B, 6, and 9, the de-liquefier 14 preferably includes a screw press the may have either a single screw (e.g., Brown Stock Washing) or double screw (e.g., 2 counter rotating intermeshed screws). Examples of screw presses include: Andritz/Dupps Screw Press (available from Andritz-Ahlstrom); Belpress BP (available from Beltec); Krima Screw Press (available from Cellwood); FKC (available from FKC=Fukoku Kogyo); CHS (available from GL&V/Celleco); and Fibropress (available from Thermo Black Clawson, Lamort).

Other types of equipment that may be included with the de-liquefier 14 include the Curved screen {e.g., Hydra-Screen, Hydrasieve, and Micra-Screen (available from Andritz-Ahlstrom); Bow Screen and DSM (available from Dutch State Mines and GL&V/Celleco); and Hydrosil (Spirac) and Vertiscreen (available from Thermo Black Clawson); the Decker; Dewatering drum screen {e.g., (available from Comer); AKTROM (available from Kufferath); RF (available from Saltec and Sinclair); Free Drainage Thickener (available from Thermo Black Clawson, Lamort);

Screen Drum F type and ZTR.B (available from Voith Paper and Warburton Holder)}; the Disc save all filter {e.g., Discfilter (available from Hydrotech)}; the Disc thickener {e.g., AKSE (available from Kufferath)}; the Gravity decker {e.g., Hooper (available from Andritz-Ahlstrom and Finckh); Drainpac (available from GL&V/Celleco); Tamdec (available from Metso Paper/Fiber); the Gravity screen {e.g., (available from Nash); Sweco (available from Sweco); and the Gravity Strainer (available from Thermo Fibertek)}; the lamella plate clarifier (inclined plate clarifier, slant plate clarifier) {e.g., Settle Plate Clarifier (available from Heuser Apparatebau)}; the Plate and frame press {e.g.,: filtomat MCFM (available from Filtration Ltd) and Omnifilter (available from Voith Paper)}; the Rotary pressure drum filter/washer; the Rotary vacuum drum filter/washer; the Screw thickener {e.g., KW Washing Screen (available from Andritz-Ahlstrom); Krima Screw De-waterer (available from Cellwood and Comer); Akusand, Akuscreen (available from Kufferath); Sandsep, Spiropress (available from Spirac), Hydrascreen (there is also a vertical version), and Lamort-Baker Water Extractor (available from Thermo Black Clawson, Lamort)}; the Sidehill screen {e.g.,: Kenfil (available from Kent Filtration)}; the Spraying filter {e.g.,: Spraydisc (available from GL&V/Celleco) and White Water Filter (Sweco)}; the Tubular filter; the Twin roll press; the PreRoll Press; WiRoll Press (available from Metso Paper/Fiber)); and the Vibrating screen.

Referring to FIGS. 1A, 1B, 2, 4A, 4B, 7 and 9, the apparatus 10 includes a blender 16. In particular, a twin-screw type of blender is most preferred. This type of mixer is commonly referred to as a tunnel washer mixer and uses a battery of basic modules and rotating inner cylinders, which transfers the stock through a continual dropping action. The blender 16 may be used to include additives and supplementary materials, including dry materials, into the fibrous material.

Dry materials that may be included are fire retardants such as, for example, boric acid, ammonium sulfate and sodium borate. When boric acid is used, about 10 percent by weight is believed to be preferable. Alternatively, the dry material may include a colorant. For example, a titanium dioxide may be used to whiten the processed WP. Alternatively, the colorant may be one that would act as a heat trap. That is, when the reprocessed materials used in a building or facility where they are taking advantage of, for example, solar heating or other types of heat sources, the colorant would be of such a color, chemical composition and combination that would allow the processed recycled material not only to act as an insulating material but also to trap heat for later radiation to heat such a structure.

Another example of a dry material is a tracer substance. Examples of such substances are included in, for example, U.S. Pat. No. 4,359,353 (disclosing the use of polypeptides as tagging materials); U.S. Pat. No. 4,363,965 (disclosing the use of a Mossbauer isotope-containing taggants); U.S. Pat. No. 4,390,452 (disclosing the use of encoded micro particles for retrospective identification); U.S. Pat. No. 5,057,268 (disclosing the use of deuterated synthetic fibers blended with natural, non-deuterated fibers to form the paper); U.S. Pat. No. 5,409,839 (disclosing the use of perfluorocarbon tracers (PFT'S) as tagging materials); U.S. Pat. Nos. 5,451,505; 5,747,937 (disclosing the use of nucleic acids as taggants); and U.S. Pat. No. 5,760,394(disclosing the use of multiple isotopes of one or more elements in controlled abundance ratios in a tagged substance), subject matter of each being hereby herein incorporated by reference in its entirety.

Moving on to FIG. 2, there is shown an apparatus 10 according to the present invention that, in addition to including the liquid base fiber separator 12, the de-liquefier 14 and the blender 16, includes a dryer 20. Details in regard to the dryer 20 are set forth in FIG. 3. The dryer 20 may be any combination of the numerous dryers known in the paper-making, chemical, or fiber processing industries modified to dry the treated fiber material. Traditionally, the wet end of a pulp dryer (pulp machine) has generally been similar to that of a papermaking machine modified to accommodate the higher headbox consistency range (e.g., between about 1.0 wt. % and 1.8 wt. %), a pulp web grammage of 600-1,000 $g/m^2$, and the use of high solids presses.

An alternative is a twin wire press, in the place of a fourdrinier forming table, with a high solids press. In this approach, no vacuum need be applied and the grammage may be higher at up to about 1,250 g/m2. Examples of such an alternative include: Double Wire Press (available from Andritz-Ahlstrom); Tetraformer (available from GL&V); and PressFormer (available from Metso Paper/Fiber). As another alternative, the dryer 20 may include either conventional papermaking steam-heated dryer cylinders, or an air flotation dryer. In the latter, the pulp web may make several passes over rows of air bars. Air flotation drying capacity may be increased (or introduced) by adding decks vertically or in the machine basement.

One papermaking steam-heated dryer cylinder is called an MG cylinder (Yankee cylinder). Suppliers of the MG cylinder (Yankee cylinder) include: Metso Paper/Paper; Mitsubishi; Sam Yang; Sandusky Walmsley; and Voith Paper.

Likewise, through air drying (TAD, thru-air drying) may employ for highly porous grades, such as low grammage bulky tissue (e.g.: 25 g/m2) and nonwovens. TAD uses a high velocity hood with either a honeycomb-structure cylinder or a perforated suction drum to carry the web. TAD may be used by itself, before, or after a MG cylinder. Examples of the through air drying (TAD, thru-air drying) include: High-Tech Drum (available from Fleissner, MEGTEC, and Toschi) and Honeycomb (available from Metso Paper Honeycomb).

The table below compares some basic characteristics of some different methods of drying fiber materials.

| Drying Technology | Main Drying Principle | Mechanical Pressure Applied | PM Web Drying Main PM Drying | PM or Coater Incremental PM Drying | Moisture Profile Improved |
|---|---|---|---|---|---|
| Conventional Steam Dryers | Conduction | Fabric only | Yes | Yes | No |
| Hood + Pocket Ventilation | Convection | No | Yes | Yes | Yes |
| Steam Shower | Latent heat | No | No | Yes | Yes |
| Infrared | Radiation + Convection | No | No | Yes | Yes |
| High Velocity Hood | Convection | No (MG effect) | Yes | Yes | Yes |
| Through Drying | Convection | No | Yes | Yes | Low g/m² |
| Air Flotation | Convection | No | Yes** | Yes | No |

-continued

| Drying Technology | Main Drying Principle | Mechanical Pressure Applied | PM Web Drying Main PM Drying | PM or Coater Incremental PM Drying | Moisture Profile Improved |
|---|---|---|---|---|---|
| Dryer Direct Hot Pressing | Conduction | Yes | No | Yes | No |
| Gas Heated Dryer | Conduction + Radiation | Fabric only | No | Yes** | No |
| Press/Impulse Drying | Conduction + Radiation | Yes | Maybe | Likely | Likely |

**Indicates an uncommon use.

In the preferred embodiment, the dryer may be a flash dryer, sometimes called a spray dryer in the industry. In the preferred embodiment, the flash dryer is a Winergy Model AS48 cyclonic hot air dryer, available from Superior Technologies of Belle Chasse, La.

The apparatus may further include a baler 24, a bagger 26, and a plurality of dust collectors 22. The treated fiber materials may be dried to between about 85 wt. % and 100 wt. % total solids and preferably between about 90 wt. % and 95 wt. % total solids. If the moisture content is too high, paper products may begin to re-clump, which adversely affects the handling and physical characteristics of the products. The desired moisture content may be achieved by a moisture gauge. Also, a cooling section may be present. Examples of equipment including a cooling section include: FC series (available from ABB Flaikt) and PulpDry (available from Metso Paper/Fiber).

Using the baler 24, the dried treated fiber materials may cut into sheets and piled by a cutter-layboy, to make up bales. The layboy may incorporate a reject gate, cutter knife adjustment at full speed, bale wrapper cutting, sheet counter and batch scale, and may be controlled by a PLC controller (e.g., available from Lamb). Individual bales may be pressed (to minimize shipping volume), and wrapped (often using sheets of the same pulp). Examples of such baling equipment include: Duowrap and Uniwrap (available from Lamb). Bales of the treated material may then weighed, bale wired, and marked (e.g.: by ink jet printer). Bales of the treated fiber material may also be stacked and then unitized into wired or strapped units 2-4 bales wide by either 3 or 4 bales high for subsequent bulk handling. Examples of such equipment include: Unityer (Lamb available from) and Robostacktyer and Robotyer (available from Metso Paper/Fiber).

If the treated fiber material is to be used as fluff treated fiber material, it may wind up in a jumbo reel, for rewinding into smaller rolls. "Fluff" is a relatively inexpensive cellulosic fiber derived from wood pulp that has excellent bulk, softness, and high absorbency. Fluff is widely used in manufacture of disposable towels and tissues. It is usually made via an "air laid" nonwoven process by fiberizing a sheet of wood-pulp fibers Alternatively, the treated fiber material may be bagged. In the preferred embodiment, suitable equipment may be obtained from Amark Packaging Systems of Kansas City, Mo. and Premier Tech Ltd., of St. Bruno, Quebec, CANADA.

The dust collectors 22 may be that conventionally used in the art or may include some of the features included in impingement dryer hoods. Such hood may be high velocity, with an air impingement speed up to about 150 m/s, or designed for lower velocity.

As in papermaking, hood may use steam-heated air, or be direct fired using gas or oil. The heated air may be forced out of nozzles or slots, impinge on the treated fiber material, and remove the moisture-laden air layer. Examples of such equipment include: HVH (available from ABB Fläkt, Brunnschweiler, Greenbank, Metso Paper/Paper, Premiair Technology, Spooner) and Correcta Hood (available from Voith Paper).

Referring now to FIG. 4A, a block diagram is seen of an alternative embodiment of the present invention that relates to a de-liquefier 14 and a blender 16 downstream from the feedstock of the de-liquefier 14. In each of the earlier Figures, a waste liquid treater 42 is also included in the system. The waste liquid treater 42 is an optional aspect of the present invention and may be beneficial in allowing the reuse of the liquid in the processing of the recyclable materials.

Now referring to FIG. 4B, we see a detail of the apparatus 10 of FIG. 4A. The de-liquefier 14 may be a screw press 40, which preferably would have a bowed screen 40, and as discussed earlier, the amount of solids within the feed stock material to the de-liquefier 14 would be between about 1 and 10 percent weight solids and more preferably about 8 weight percent solids. Downstream from the feed stock material may also be the blender 16. In a preferred embodiment, this blender 16 is the type of blender that is used for blending dry materials to a wet material. As previously mentioned, a preferred type of blender appears to be a twin screw type of blender although any blender known in the industry may also suffice as long as it meets the function of the invention.

FIGS. 3, 5, 6, and 7 show some of the details for the various elements of the present invention. In particular, FIG. 5 shows a liquid-based fiber separator 12 that may include a conveyor 46 for providing the WP to the fiber separator 12. Those skilled in the art will recognize that those types of conveyors are commonly used to, feed WP to the pulper. To that end, the fiber separator 12 of the present invention may include one or more of such conveyers. The conveyer includes a steel slat type conveyor (or apron conveyor), for baled and loose WP; a chain belt type conveyor, for loose WP, where the rubber belt is driven by a chain; and a sliding belt type conveyor, for dewired bales and loose WP, where the belt (with a low friction underside) may be supported by a steel trough. Although not shown in FIG. 5, bale wire may be removed automatically (dewiring) and compacted using equipment such as: Wire Wizard (available from Advanced Dynamics, B+G Fördertechnik, and FMW); Wirewolf (available from Lamb and Metrans); and Wiremaster (available from Neilsen & Hiebert Systems and Suntib).

FIG. 6 shows the aspects of the de-liquefier 14 including a thickener and a screw press including a curve screen 40, as discussed above.

Figure 7:
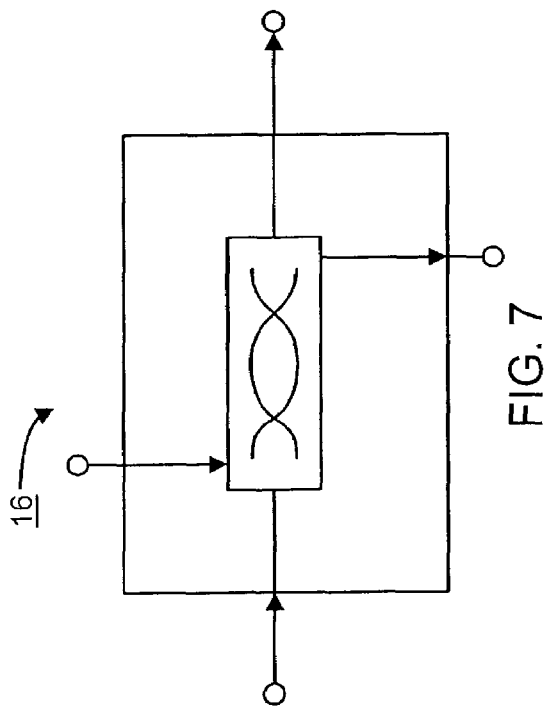
FIG. 7 is a detail of a bender of the apparatuses of FIGS. 1A, 2, and 4A.
Figure 8:
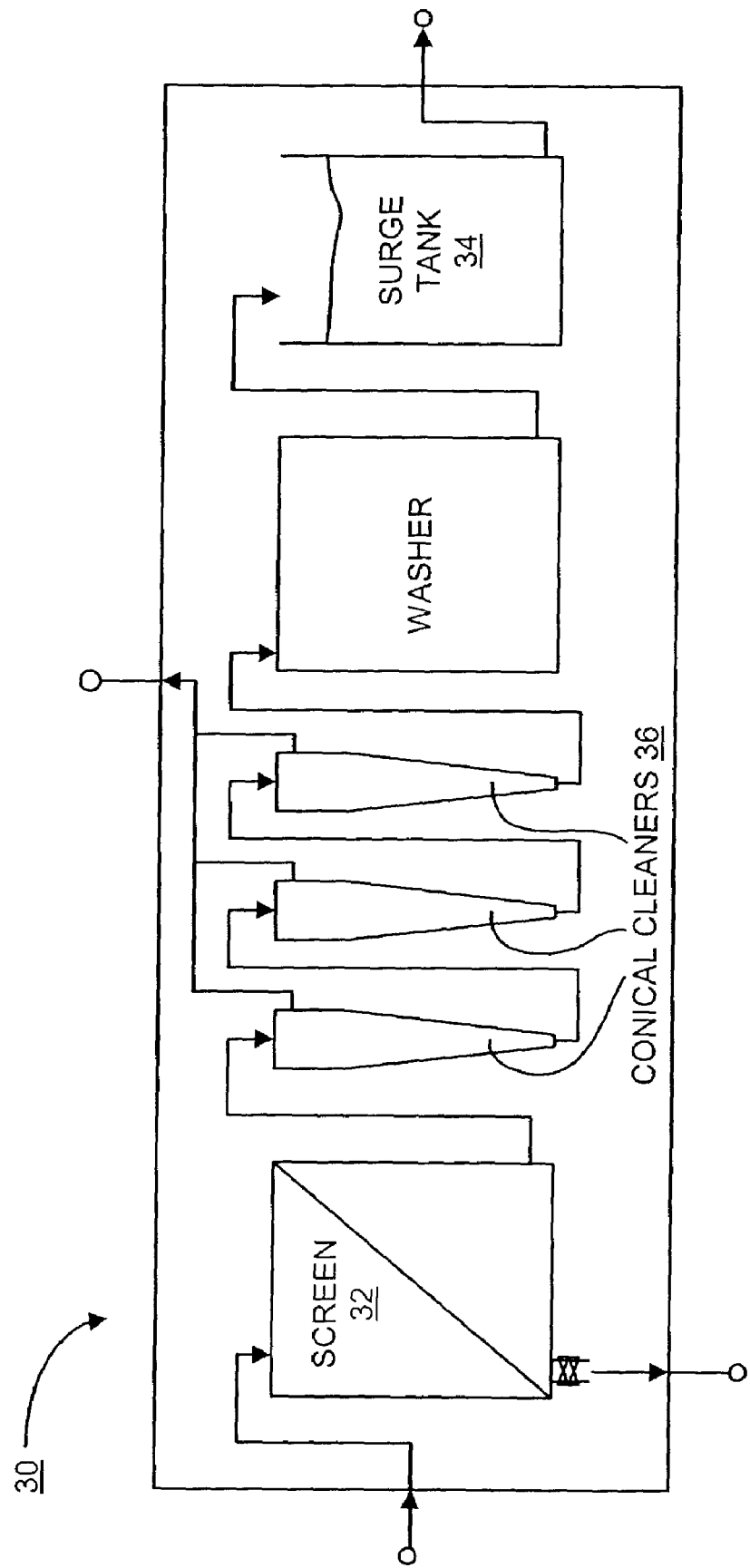
FIG. 8 is a detail of a fiber cleaning system that may be added to the apparatuses of FIGS. 1A, 2, and 4A.

FIG. 7 shows aspects of the blender 16 and FIG. 8 shows further aspects of the present invention relating to a fiber cleaning system 30. The fiber cleaning system 30 may include, for example, a screen 32, conical cleaners 36, a washer or washers (not numbered), and a surge tank 34.

A screen 32 may be used in the cleaning system 30 to remove prohibitives, shives and knots. Common principles apply to the variety of useable screens. In each case, the actual equipment used is that appropriate for the fiber material and prohibitives present. A pressure screen is only one type useable as screen 32. Examples of such a screen include: pressure screens (available from A. Celli, Fiedler, Finckh; BelWave (available from GL&V); Nimega (available from Metso Paper/Fiber); Cobra, Lehman, and ThermoTek (available from Thermo Black Clawson, Lamort); and C-Bar (Voith Paper).

Screening is commonly divided into coarse, intermediate and fine. Coarse screening may use screen hole diameters usually ranging between about 0.5-2.5 mm (between about 20-100 thousands), but going up to about 10 mm at a "high consistency" feed of between about 2 wt. % and 5 wt. %. If following a pulper extraction plate orifice diameter of between about 3 or 6 mm, hole size may be reduced to about 1 mm. Intermediate screening uses screen slot widths usually ranging between about 0.25-0.65 mm (between about 10-26 thousands) at a "high consistency" feed of between about 2.5 wt. % and 5 wt. %. Fine screening uses screen slot widths usually ranging between about 0.08-0.25 mm (between about 3.2-10 thousands) at a "low consistency" feed of between about 1 wt. % and 3 wt. %. Either one, two or three separate screenings may be used, depending on the application. The above distinction becomes blurred when considering the pulper extraction plate (sometimes with a screen following it) as coarse screening and placing coarse and fine screen stages in one pressure screen body. Examples of other usable screens include: Ahlsorter, Hooper, MODUScreen C, H, and F (available from Andritz-Ahlstrom); Cyberscreen, PV Screen, Selectifier and Ultra Screen (available from Comer); C.H. Horizontal Screen, Diabolo, and Hico Screen N (available from Finckh); Alfascreen, CellecoScreen (both horizontal), Hi-Q, S Screen (GL&V), Key Screen (Maule), DeltaScreen, MiniDelta Screen, TAP Screen, TAS Screen, and TL series (available from Metso Paper/Fiber); SP Screen series and Ultra-V (available from Thermo Black Clawson, Lamort); and Centriscreen, EcoScreen, Minisorter, MultiSorter, Omniscreen, Omnisorter and Spectro Screen (available from Voith Paper).

Some pressure screen bodies have 2 screens (e.g.: concentric baskets), so that both slots and holes may be used together. The stock may also be deflaked in the screen. E.g.: DeltaDouble (Metso Paper/Fiber), ADS Screen (DS=double separation, Thermo Black Clawson, Lamort), Low Pulse Screen, LPD (Voith Paper). The MuST screen (Multistage, Metso Paper/Fiber) can have a horizontal prescreen (typically 3 mm diameter holes) and up to 3 wedge wire slotted screen stages (0.08-0.45 mm).

A showering screen is a recent device intended to wash good fiber out of the final rejects. It resembles a pressure screen (with a basket), but also contains showers that separate good fiber while the rotor does some deflaking. Fiber yield is thus improved (up to 50% of rejects can be good fiber), and the quantity for landfill reduced. Examples of its use in WP systems include after the pulper and HD cleaner in the place of multistage coarse screening and when multistage screening is required, as a tailings screen for the final stage screen rejects.

The four main alternative hook-ups for pressure screens include cascade, forward flow, partial cascade, and A-B configuration. Variations exist according to the number of stages, position in the process, equipment (e.g.: in parallel), experience, etc. Cascade has traditionally been used most commonly. Accepts from the first (primary) stage continue downstream, and its rejects are fed to the 2nd (secondary) stage. Accepts from the 2nd stage are returned to the feed of the first (primary) stage, while its rejects go to the 3rd (tertiary) stage. Rejects from the last stage go to a tailings screen.

In forward flow, smaller orifices are present in the 2nd (secondary) stage screens and 3rd (tertiary) stage screens (relative to the first (primary) stage), and to send all their accepts downstream (i.e., forward)—rather than sending them back to the elative to the first (primary) stage. This results in fewer prohibitives being recirculated, but the prohibitives content of the main stock flow may be higher.

Partial cascade is similar to forward flow, except that accepts from the 3rd (tertiary) stage screen are rescreened in the 2nd (secondary) stage screen instead of joining the main stock flow.

In A-B configuration, two similar screens are employs in series for mechanical pulp screening and sometimes fine screening. The additional unit may give greater cleanliness relative to forward flow.

The conical cleaners 36 may include one or more hydroclones. As will be recognized by those skilled in the art, hydrocyclone (hydroclone) is the generic name for equipment that utilizes the centrifugal force (Latin: fleeing from the center. cf: centripetal force. Latin: seeking the center), and other hydrodynamic forces, produced by pumping into a cyclone (i.e.: conical body) for insoluble solids separation. The cyclone geometry provides decreasing (cross-sectional) diameter. For the solids, this means increasing acceleration, due to the increasing G (g-force. i.e., acceleration, measured relative to the acceleration of free fall due to gravity, 9.81 m/s2, 32.2 ft/s2), and increasing Prohibitive/fiber separation efficiency. Banks (e.g., rows) of the numerous individual cleaners may be combined in a variety of orientations (a circle, rows, etc.) so as to share common feed and discharge chambers. Examples of such a variety of orientations include: Spirelpak (available from Thermo Black Clawson, Lamort) and Tripac 90 (available from GL&V/Celleco).

The conical cleaners 36 may include one or more of a forward flow (conventional) cleaner; a high density cleaner, a reverse cleaner, a through flow cleaner, core bleed cleaner, an asymmetrical cleaner and a rotating body cleaner. A conventional centrifugal cleaner (CC, centricleaner, forward flow cleaner, free vortex cleaner) is approximately the shape of a narrow cyclone (i.e., an inverted cone), with the stock entering at a tangent in the top. A whirlpool-like vortex is formed, so that high-density prohibitives move to the bottom of the cone from where they are rejected. The accepted stock goes to the top of the cone from where it passes upstream. Examples of forward flow (conventional) cleaners include: Ahlcleaner RB series, Centri-Cleaner, and TC series (available from Andritz-Ahlstrom, Comer and Fiedler); Albia T, Cleanpac 270 to 1500 series, Elast-O-Cone, Posiflow and TW series (available from GL&V); CT series, Hydraclone, ELP series and Ultra-Clone (available from Thermo Black Clawson, Lamort); and Cyclean, and KS series (available from Voith Paper and Wilbanks). Up to about 5 stages of cleaners may be used, depending on the cleanliness required.

A high density cleaner (HD cleaner) is a large diameter forward flow cleaner operating at between about 2% and 6% consistency. It is located close to the pulper when using lower grade WP furnishes and removes high-density prohibitives. An elutriation section helps to separate fiber from rejects. The latter are removed from the rejects chamber either manually (via the door) or automatically (by 2 timed valves). Examples of high density cleaner (HD cleaner) include: (that available from A. Celli); Ahlcleaner RB 300HD (available from Andritz-Ahlstrom); Cleantrap, Grubbens High Density Cleaner (available from Cellwood), (Comer); Albia TFRB, Combitrap (available from GL&V); HC Cleaner (available from Metso Paper/Fiber); HD Cyclone, Liquid Cyclone, Low Profile Cyclone and Ruffclone (available from Thermo Black Clawson, Lamort, Aikawa); D1C, D2C, and High-Consistency Purifier S series and T series (available from Voith Paper).

In a reverse cleaner, the normal accepts and rejects exit points are reversed. Good low-density prohibitives removal may be achieved. About 50% of the flow (and proportionally more of the fiber) may be rejected. The accepts flow may be thickened by a factor of up to about 2.5. Examples of reverse cleaners include: Cleanpac 270R, Cleanpac RT (reverse, thickening), Tripac 90 Reverse (available from GL&V/ Celleco); Contra-Clone, CT series, and Xtreme, (available from Thermo Black Clawson, Lamort); and KS series (available from Voith Paper).

In a through flow cleaner (flow through, parallel flow), both the rejects and accepts come out at the same end. It removes low-density prohibitives together with air. Rejects are about 10% of the feed flow. Examples of through flow cleaners (flow through, parallel flow) include: Cleanpac 250 LWR and UniFlow (available from GL&V); XX-Clone (available from Thermo Black Clawson); and Coreclean (available from Voith Paper).

The core bleed cleaner has the configuration of a forward flow cleaner, but with the addition of a central bleed for low-density prohibitives (plus deaeration) from the accepts stream. Each rejects stream equals about 10% of the feed flow. Examples of core bleed cleaners include: Ahlcleaner SC 133 (available from Andritz-Ahlstrom); Albia TDLR, Cleanpac 350 Combi, and Cleanpac 700 LD (available from GL&V); and KS/E series (available from Voith Paper).

The asymmetrical cleaner is essentially a forward flow cleaner, but with one straight side and the other side converging on it. This departure from symmetry about a central axis provides, among its benefits, the ability to manipulate (and remove) particles according to their position within the cleaner strata (e.g., levels). The asymmetrical cleaner takes two different forms: those resembling the Cleanpac 270 SR (Step Release having steps in the converging side plus a constricted cone end removed available from GL&V/Celleco) and those resembling the Cleanpac 270 HyS (having increases in the feed and accepts pressure available from GL&V/Celleco).

The rotating body cleaner differs from the others in that a horizontal cylinder (e.g., 500 mm diameter) rotates at 1,300-1,500 rev/min, thus exerting a greater centrifugal force of about 700 G over a longer retention time, to give good low-density prohibitive removal efficiency. An example of a rotating body cleaner includes the Gyroclean (available from Thermo Black Clawson, Lamort). Gyrocleans may be efficient stickies separators.

An elutriation section may be added to the last stage of a conical cleaner 36 to reduce the rejects' fiber content and liquid consumption. This may be achieved by injecting liquid, which pushes good fiber back into the system for subsequent separation. The elutriation section may include valves to periodically discharge the rejects. Examples of elutriation sections include: Albia WFRC (water and fiber recovery control), FRB, RCC, and Fibermizer FMZ (available from GL&V) and Rejectomat (available from Voith Paper).

FIG. 9 shows all of the components fiber separator 12, a fiber cleaning system 30, de-liquefier 14, blender 16, and dryer 20 combined in a manner that is believed to be beneficial for production of treated fiber materials according to the present invention. Detail concerning specific piece of equipment or sub-equipment may be found at http://www-.paperloop.com/pp_mag/paperhelp/9.shtml, entitled "9. Waste Paper Recycling, the subject matter of which is herein incorporated by reference in its entirety.

It is believed that apparatus 10 of the present invent may process any of the variety of grades of WP available on the market. Those skilled in the art will appreciate that although national systems for classifying WP grades differ, there are four, generally accepted, broad classes of WP. These four broad classes of WP are then subdivided further. Specifications exist as to freedom from prohibitives (e.g., In the USA, the Institute of Scrap Recycling Industries (ISRI) definitions and In Europe, CEPI and the Bureau of International Recycling have unified and streamlined 14 national standards into a single European List of Standard Grades (dated February 1999). It has been submitted to CEN, for inclusion in the revision of standard EN 643, and can be found on the BIR's Web site.). An out-throw is a paper grade that has been included in an incompatible grade of WP.

The four broad classes of WP are pulp substitutes, de-inking grades, brown kraft grades and mixed waste paper (MWP). Pulp substitutes are generally substitutes for chemical pulps. Their quality is the most similar to that of virgin fiber, so their price is also related to virgin fiber {e.g., converting and printing trimmings; guillotine shavings (mechanical and wood free separately); tinteds (suitable for bleaching); and lightly printed WP (e.g.: ledger, ruled book trimmings). Poly-coated board (e.g.: plastic coated liquid packaging board cartons, footboard, paper plate and cup board) also yields good quality pulp (particularly waste straight from converters)}, but requires separate initial repulping treatment.

Brown kraft grades include for example: corrugating plant waste; old corrugated containers (OCC); KLS (kraft lined strawboard is waste-based OCC containing >33 wt. % kraft linerboard); used kraft sacks; and converting waste. This WP is used mainly for test linerboard and fluting. OCC bleaching is used for fine papers.

Mixed waste paper (MWP) is the cheapest and lowest quality. Traditionally, this has been the balance, after taking out other grades easy to sort, plus household waste paper. It has been used for chipboard and gray back folding boxboard.

There has been a continuing degradation in the quality of old newsprint (ONP) marketed in the United States. ONP is usually graded as #6 or #8. No. 8 has been the industry standard for use in cellulosic insulation but, with the overall degradation in quality, grade #8 ONP now is effectively becoming about a grade #6 which, in turn, is making it difficult for the cellulosic insulation industry to produce a cost competitive product due to the higher processing costs associated with poorer feed stock. The present invention is able to process even MWP, the cheapest and lowest quality, economically.

Household waste is commanding attention as the last major vein to be mined. Called residential mixed paper (RMP), the US recovery rate of the approximately 9 million tons per year is only about 20%. The collection system utilized determines the quality of WP resulting. When ONP is collected separately in the United States, the resulting WP composition is approximately: 30% carton board/SBS packaging; 30% white grades and mail; 25% mechanical fiber (news/magazine/coated and uncoated); and 15% brown kraft (bag and old corrugated containers (OCC)). This WP may be a substitute for medium quality OCC, with the lower price offsetting the lower yield.

In operation, an appropriate mix of the variety of grades of WP is provided to an apparatus 10 for treating fibrous material as depicted FIGS. 1A, 1B, 2, 4A, and 4B. When the apparatus 10 includes a de-liquefier 14 and blender 16, as depicted in FIGS. 4A and 4b, the WP may be in a slush form as discussed below. Alternatively, when the apparatus 10 includes a fiber separator 12 in addition to the de-liquefier 14 and blender 16, as depicted in FIGS. 1A, 1B, 2, and 9, any of the variety of WP grades may be provided to the fiber separator 12 to break the WP down to a fiber material. The broken down fiber material slush is then transferred to the de-liquefier 14 to remove liquid in preparation for adding a dry material to the de-liquefied fibrous material. The addition of the dry material is made using the blender 16 while the de-liquefied fiber material remains wet. Examples of such equipment are the Mycar mixer or the CBFRS, Regenex with the de-liquefied wet fiber material at room temperature and with between about 25% and 50% consistency. The treated de-liquefied material may be transferred to containers for shipping to a different location.

Alternatively, as seen in FIG. 2, the treated de-liquefied fiber material may be transferred to a dryer 20 for drying. Liquid from the fiber separator 12, the de-liquefier 14, and the blender 16 may be circulated through the waste liquid treater 42 and recycled as suggested in FIGS. 1A and 4A.

The input materials for the apparatus 10 including a de-liquefier 14 and blender 16, as depicted in FIGS. 4A and 4b, may be in a slush the WP. Purchased pulp (e.g., market pulp) may be shipped in a slushed form for use in the apparatus 10, as depicted in FIGS. 4A and 4B. The operation parallels the operation downstream of fiber separator 12 for apparatus 10 having the fiber separator 12.

Figure 3:
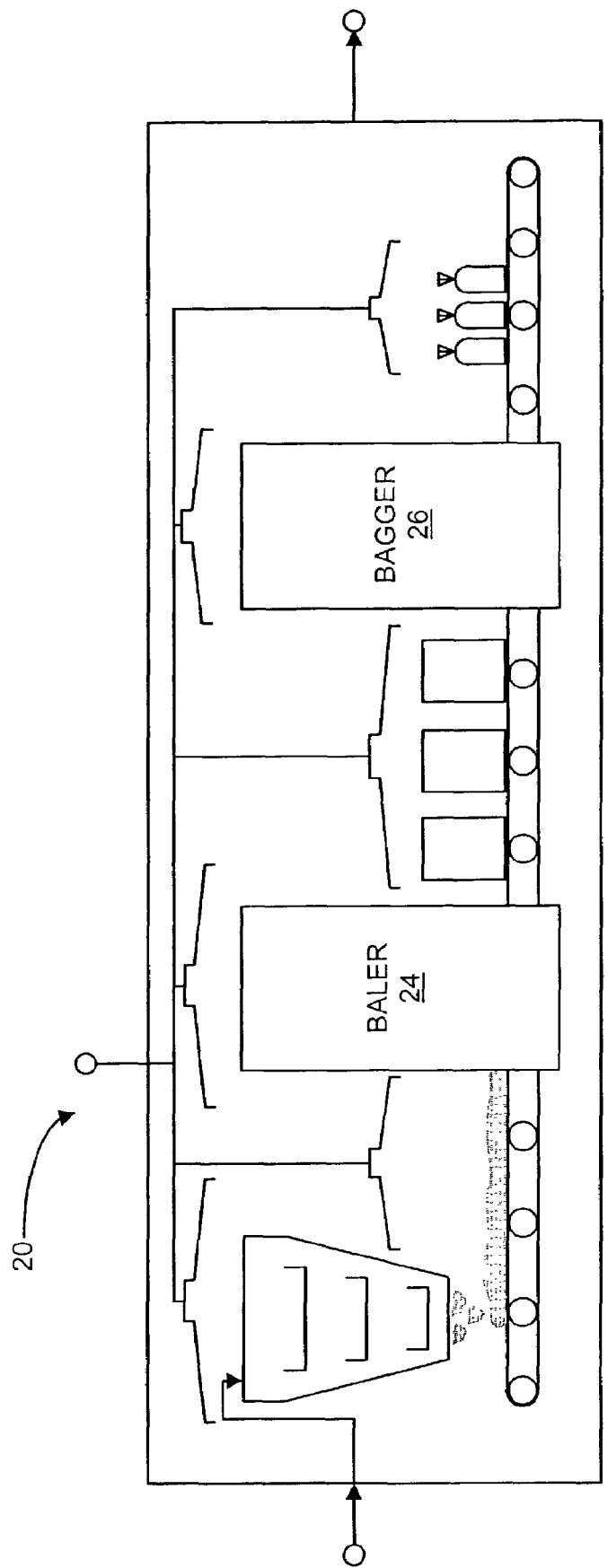
FIG. 3 is a detail of the dryer of FIG. 2.

The drier 20 of FIGS. 2, 3 and 9, dries the treated fiber material at a temperature range of between about 200 and 250° F., with 220° F. preferred, at a dwell time of preferably about one second.

In operation, the process of the apparatus 10 of FIG. 9 including the fiber separator 12, a fiber cleaning system 30, de-liquefier 14, blender 16, and dryer 20, go on as follows: In the liquid-based fiber separator 12, the reclaimed paper is run to the pulper tank on conveyor 44 and mixed with water to between about 7 wt. % and 15 wt. % consistency and pulped for up to 45 minutes. The pulped mass is then diluted with water to between about 3 wt. % and 4 wt. % consistency, filtered and moved to chest 34. The fiber is then pumped through the cleaning system 30 by passing through the chests and high density cleaners 36 and on to chest 34. The resulting slurry is put through the de-liquefied 14 and immediately on into the blender 16 for mixing in the dry fire retardant loading at room temperature and pressure. The treated fibers are then moved into the dryer 20 where they are heated to between about 200 and 250° F. with a dwell time less than about 2 seconds and dried. The fibers, separated from the water, are moved to the baler 24 and then onto the bagging unit 26 for packaging for shipment.

An alternative feed stock for the present process may be bagasse. Bagasse is the cellulosic fiber separated from the non-fibrous component of plants, such as sugar from sugar beets or sugar cane and natural rubber from rubber plants. In the case of sugar cane, bagasse is available in a bagasse belt around the world parallel to the equator, which extends from Spain in the North to South Africa and Australia in the South. Usually, the sugar cane harvesting campaign lasts 4-9 months, which means most pulp mills must carry large stocks of bagasse.

Normally, the bagasse is burned in the sugar mill's boilers to provide its steam and power requirements. Substitution of an alternative fuel frees up the bagasse for a pulp mill, but prices the bagasse at the fuel-equivalent price. Before pulping, the earth and dirt are washed off, and any magnetic materials removed.

Bagasse can be used in a wide range of paper grades, including coated papers. The following table shows some typical levels, which would also apply approximately to other non-wood pulps, with similar properties (e.g.: fiber length):

| Bagasse Pulp Grade | Paper Grade | % Bagasse |
|---|---|---|
| Bleached mechanical, chemimechanical, Or thermomechanical pulp: | Newsprint | 75–80 |
| | Mechanical printing papers | 50 |
| | Tissue | 50 |
| High yield unbleached semichemical pulp: | Corrugating medium | 75–100 |
| Unbleached chemical pulp: | Multiwall sack, extensible | 40 |
| | Kraft linerboard | 40–60 |
| | Wrapping paper (B grade) | 50–75 |
| | Fruit wrap and tissue | 60–90 |
| | Glassine and greaseproof | 50–90 |
| Bleached chemical pulp: | Printing and writing papers | 80–100 |
| | White-lined chipboard, top liner | 50 |
| | Footboard and bristol board | 65–75 |
| | Fruit wrap and tissue | 60–90 |
| | Glassine and greaseproof | 50–90 |
| | Newsprint | 35–50 |

It is believed that the production of cellulosic fiber materials as insulation to be particularly advantageous according to the present invention. The apparatus 10 and method of the present invention provides characteristics and fiber quality used by using novel and unique in combinations of standard paper industry machines. These combinations of standard paper industry machines may produce a product faster having a better quality at a lower expensive.

Additionally, the present invention provides a novel and unique means of adding dry materials to wet materials, and in particular, adding a fire retardant to cellulosic fiber materials. In the past, the means has been the addition of a dry material to dry paper or liquid material to dry paper. In other words, the fire retardant is added either as dry, completely liquid, or maybe half dry/half liquid, but it is always on the dry paper.

By the present invention, dry materials such as a dry fire retardant has been added to a liquid paper mass having between about 3 wt. % and 50 wt. % solids range, and preferably between about 3 wt. % and 20 wt. % solids range. When boric acid is used, about 10 percent by weight is believed to be preferable. The result has been a fire resistant product. A further advantage may be realized by a substantial cost savings since the wet processing may permit the reclamation of excess fire retardant from the waste liquid treater 43. Further, by using wet treated fiber materials, the process steps of drying and rewetting fiber materials are eliminated. Thus, the present invention saves several process steps while, at the same time, simplifies the overall process.

Figure 10:
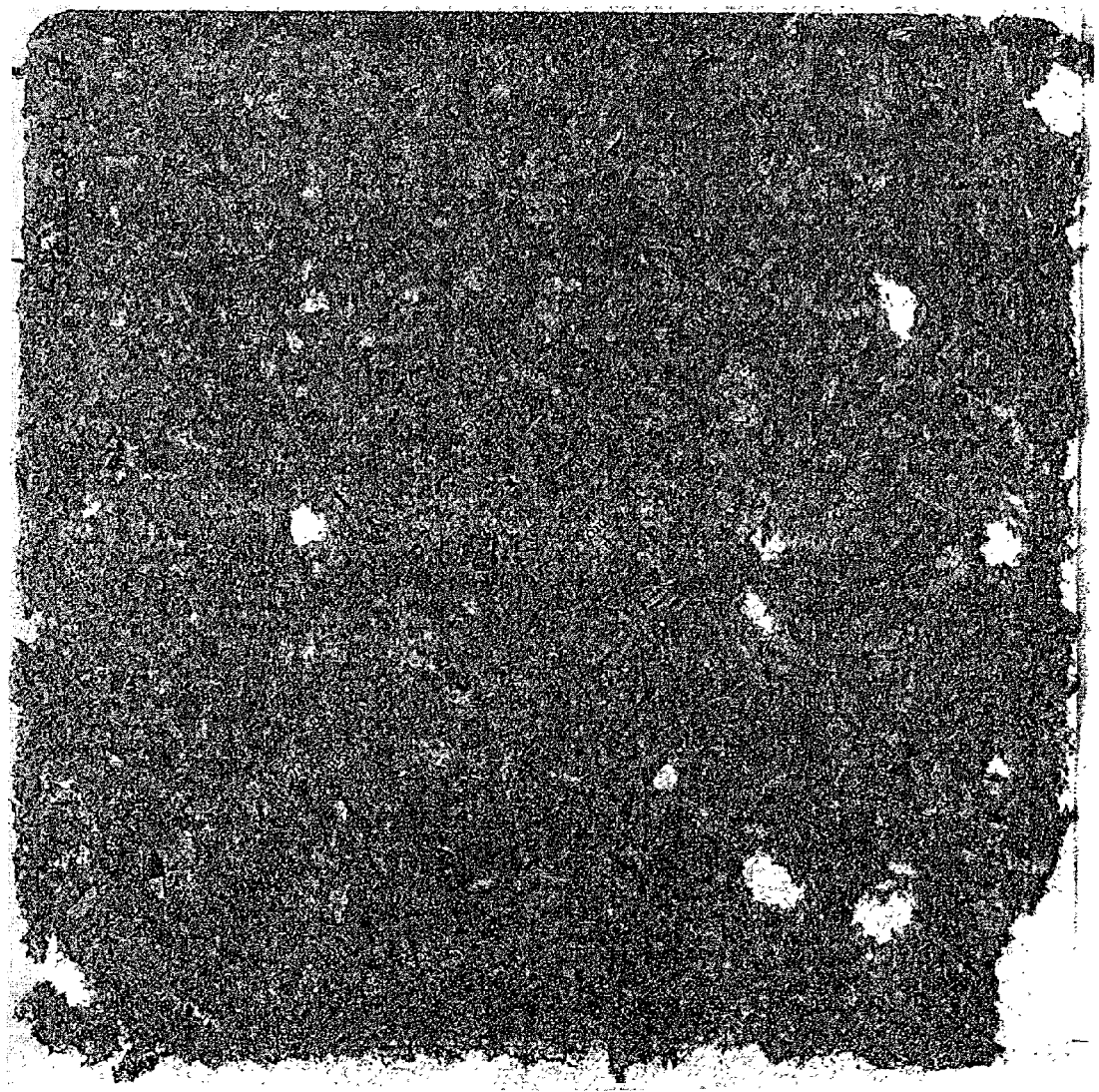
FIG. 10 is a photograph of a sample of conventionally processed cellulosic fibers showing its non-homogeneous and aggregate structure prior to classification.
Figure 11:
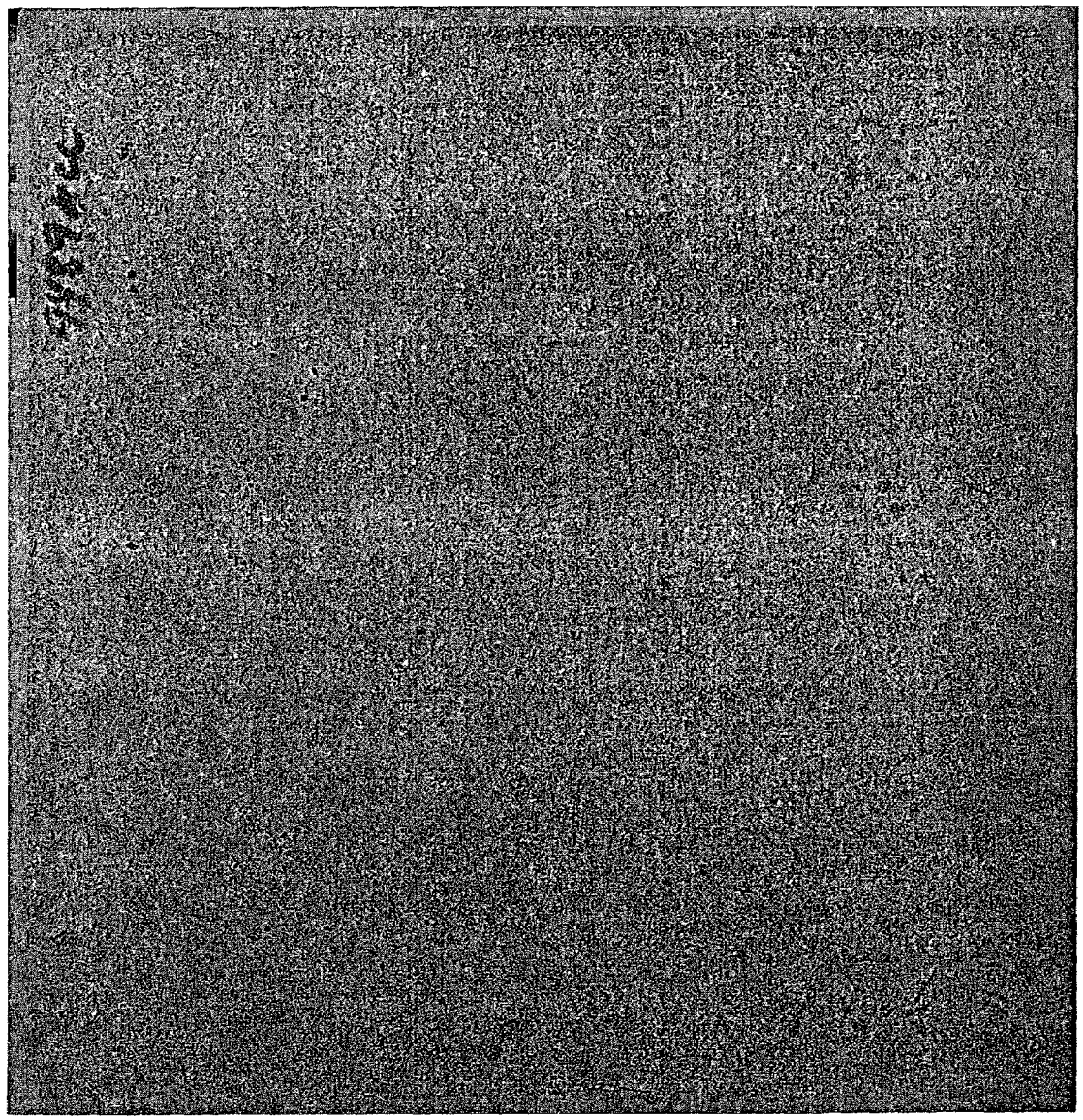
FIG. 11 is a photograph of a sample of cellulosic fibers processed according to the present invention showing its homogeneous and aggregate-free structure prior to classification.

Microscopic examination of treated fibrous material produced by the present invention for subsequent processing into, for example, cellulosic insulation, shows that the treated fibrous material is substantially homogeneous prior to classification. For example, FIG. 10 is a photograph of a sample of conventionally processed cellulosic fibers showing its non-homogeneous and aggregate structure prior to classification. For comparison, FIG. 11 is a photograph of a sample of cellulosic fibers processed according to the present invention showing its homogeneous and aggregate-free structure prior to classification. Specifically, the fibers are substantially separated into individual fibers and individual pieces of paper are no longer clearly present.

Figure 12:
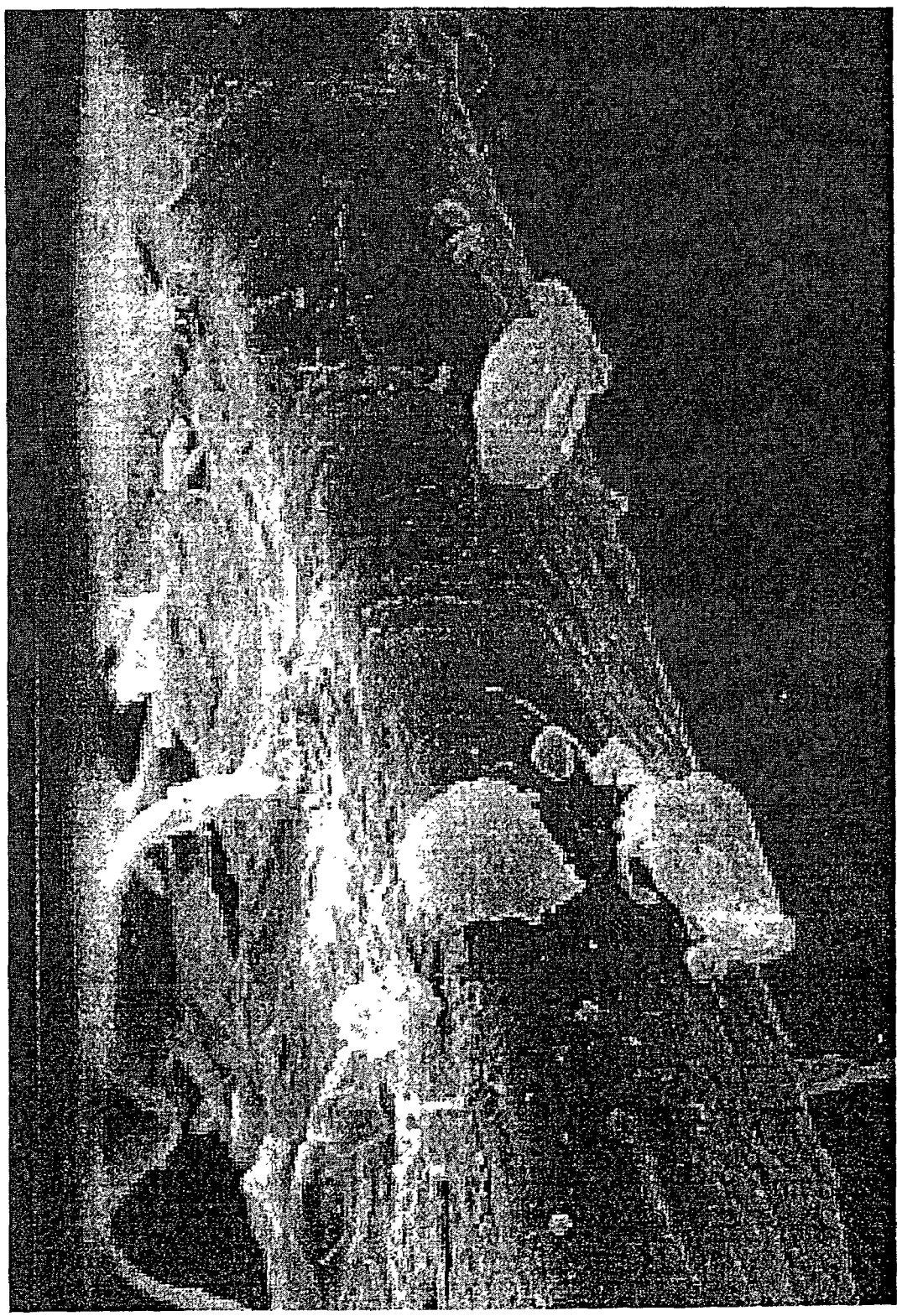
Figure 13:
FIG. 13 is a SEM photomicrograph of a sample of cellulosic fibers processed according to the present invention, which have added a supplementary dry material showing the substantially uniform coverage of the surface of the cellulosic, fibrous material.

Also, microscopic examination shows that the supplementary material, for example, the dry flame retardant, substantially uniformly covers the surface of the fibrous material. In addition, the treated fibrous material also is substantially aggregate-free prior to classification. For example, FIG. 12 is a SEM photomicrograph of a sample of conventionally processed cellulosic fibers which have added a supplementary dry material showing the non-uniform coverage of the surface of the cellulosic, fibrous material. For comparison, FIG. 13 is a SEM photomicrograph of a sample of cellulosic fibers processed according to the present invention, which have added a supplementary dry material showing the substantially uniform coverage of the surface of the cellulosic, fibrous material.

The treated cellulosic fibrous material produced by the present invention is particularly suited for further processing into cellulosic insulation, which may be used in both residential and commercial applications for both thermal and acoustic insulation applications. One example is shown in commonly owned U.S. Pat. No. 5,910,367, issued to Kean et al., for an enhanced cellulosic loose-fill insulation, the disclosure hereby incorporated by referenced in its entirety.

Certain modifications and improvements will occur to those skilled in the art upon a reading of the foregoing description. By way of example, an inclusion of a medium desolate, biodegradable mineral or vegetable oil such as soybean could be used for a dust free product. Used as a liquid, an emulsion, a dry dust inhibitor for chemicals could be added to reduce dusting of the product. Dry chemicals such as electrostatic manipulating chemicals could be also be used for this process. Also, starch and other types of adhesives can be added for application or reduce settling at different points in the process. These are then activated further on in the process when applying the product to make it stick into cavities. For example, when it is blown into a wall or blown horizontally and you want to try to stabilize it. It should be understood that all such modifications and improvements have been deleted herein for the sake of conciseness and readability but are properly within the scope of the following Claims.

We claim:

1. An apparatus for treating fibrous material, said apparatus consisting of:
   (a) a liquid-based fiber separator for substantially separating the fibrous material into individual fibers;
   (b) a de-liquefier downstream from said liquid-based fiber separator for removing liquid from the fibrous material;
   (c) a dry-to-wet blender downstream from said liquid-based fiber separator for adding a dry material to the de-liquefied fibrous material; and
   (d) a dryer downstream from said dry-to-wet blender for receiving the fibrous material substantially separated into individual fibers and drying the treated fibrous material in its separated state.

2. The apparatus according to claim 1, further including a dust collector.

3. The apparatus according to claim 1, further including a baler.

4. The apparatus according to claim 1, further including a bagger.

5. The apparatus according to claim 1, wherein said liquid-based fiber separator is a high solids, low shear pulper.

6. The apparatus according to claim 1, wherein said liquid-based fiber separator is an aqueous based separator.

7. The apparatus according to claim 1, further including a fiber cleaning system for removing prohibitives.

8. The apparatus according to claim 7, wherein said fiber cleaning system is a washer for removing prohibitives.

9. The apparatus according to claim 7, further including at least one conical cleaner for removing prohibitives.

10. The apparatus according to claim 7, further including a mesh screen for removing prohibitives.

11. The apparatus according to claim 7, further including a surge tank for accumulating the cleaned fiber.

12. The apparatus according to claim 1, wherein said de-liquefier is a screw press.

13. The apparatus according to claim 1, wherein said de-liquefier further includes a bow screen.

14. The apparatus according to claim 1, wherein the output of said de-liquefier is between greater than about 25 weight percent solids.

15. The apparatus according to claim 14, wherein the output of said de-liquefier is greater about 40 weight percent solids.

16. The apparatus according to claim 1, wherein said blender is a twin screw blender.

17. The apparatus according to claim 1, wherein said dry material includes a flame retardant.

18. The apparatus according to claim 17, wherein said flame retardant is boric acid.

19. The apparatus according to claim 18, wherein the boric acid is about 10 weight percent of the de-liquefied fibrous material.

20. The apparatus according to claim 1, wherein said dry material includes a colorant.

21. The apparatus according to claim 20, wherein said colorant is titanium dioxide.

22. The apparatus according to claim 20, wherein said colorant is a heat trap.

23. The apparatus according to claim 22, wherein heat trap colorant is titanium oxide.

24. The apparatus according to claim 1, wherein said dry material includes tracer substances.

25. The apparatus according to claim 24, wherein said tracer substances are selected from the group consisting of radioactive isotopes, colorimetric indicators, visual indicators and stable doping agents.

* * * * *